(12) United States Patent
Raithel et al.

(10) Patent No.: US 12,475,614 B2
(45) Date of Patent: Nov. 18, 2025

(54) SIMULTANEOUS MULTI-SLICE PROTOCOL AND DEEP-LEARNING MAGNETIC RESONANCE IMAGING RECONSTRUCTION

(71) Applicants: Siemens Healthcare GmbH, Erlangen (DE); New York University, New York, NY (US)

(72) Inventors: Esther Raithel, Dormitz (DE); Boris Mailhe, Plainsboro, NJ (US); Mahmoud Mostapha, Princeton, NJ (US); Jan Fritz, Baltimore, MD (US); Florian Knoll, New York, NY (US); Marcel Dominik Nickel, Herzogenaurach (DE); Gregor Körzdörfer, Erlangen (DE); Inge Brinkmann, New York, NY (US); Mariappan S. Nadar, Plainsboro, NJ (US)

(73) Assignee: Siemens Healthineers AG, Erlangen (DE)

( * ) Notice: Subject to any disclaimer, the term of this patent is extended or adjusted under 35 U.S.C. 154(b) by 540 days.

(21) Appl. No.: 17/698,199

(22) Filed: Mar. 18, 2022

(65) Prior Publication Data

US 2023/0298230 A1  Sep. 21, 2023

(51) Int. Cl.
*G06T 11/00* (2006.01)
(52) U.S. Cl.
CPC ........ *G06T 11/005* (2013.01); *G06T 2210/41* (2013.01); *G06T 2211/424* (2013.01)

(58) Field of Classification Search
CPC ........................ G06T 11/005; G06T 2211/424
See application file for complete search history.

(56) References Cited

U.S. PATENT DOCUMENTS

| | | | |
|---|---|---|---|
| 2010/0039110 A1* | 2/2010 | Takahashi | G01R 33/5611 382/280 |
| 2019/0250237 A1* | 8/2019 | Boernert | G01R 33/3852 |
| 2020/0294229 A1* | 9/2020 | Schlemper | G06V 10/89 |
| 2020/0300957 A1* | 9/2020 | Chen | G01R 33/5608 |
| 2020/0319283 A1* | 10/2020 | Wang | G01R 33/5608 |
| 2022/0051454 A1 | 2/2022 | Nickel et al. | |
| 2022/0114771 A1 | 4/2022 | Arberet et al. | |
| 2022/0165002 A1 | 5/2022 | Mostapha et al. | |
| 2022/0215600 A1 | 7/2022 | Arberet et al. | |
| 2023/0135995 A1 | 5/2023 | Chen et al. | |

OTHER PUBLICATIONS

Zhong X. Nickel M. et al.:"Liver Fat Quantification Using a Multi-Step Adaptive Fitting Approach with Multi-Echo GRE Imaging Magnetic Resonance in Medicine", 72:1353-1365 (2014).

(Continued)

*Primary Examiner* — John B Strege
(74) *Attorney, Agent, or Firm* — Banner & Witcoff Ltd.

(57) ABSTRACT

Various techniques of reconstructing multiple Magnetic Resonance Imaging, MRI, images for multiple slices based on an MRI measurement dataset that is acquired using a simultaneous multi-slice protocol and undersampling and K-space are disclosed. A convolutional neural network can be used to implement a regularization operation of an iterative optimization for the reconstruction, i.e., an unrolled neural network or variational neural network. A combination with Dixon imaging, i.e., separation of multiple chemical species, is disclosed.

9 Claims, 2 Drawing Sheets

(56) References Cited

OTHER PUBLICATIONS

Zahneisen B., Ernst T. et al: "SENSE and simultaneous multislice imaging", in: Magn Reson Med. Nov. 2015;74(5):1356-62. doi: 10.1002/mrm.25519.

Ronneberger, O., Fischer, P., & Brox, T.: "U-net: Convolutional networks for biomedical image segmentation", Computer Science Department and BIOSS Centre for Biological Signalling Studies, University of Freiburg, pp. 234-241, 2015.

Setsompop, Kawin et al. "Blipped-Controlled Aliasing in Parallel Imaging for Simultaneous Multislice Echo Planar Imaging With Reduced g-Factor Penalty" Magnetic Resonance in Medicine; vol. 67; No. 5; pp. 1210-1224; DOI 10.1002/mrm.23097.; 2012.; 2012.

Yu et al; "Deep iterative down-up cnn for image denoising." Proceedings of the IEEE/CVF Conference on Computer Vision and Pattern Recognition Workshops. 2019.

Pruessmann, Klaas P. et al. "SENSE: Sensitivity encoding for fast MRI" Magnetic Resonance in Medicine, vol. 42, No. 5, pp. 952-962, Nov. 1999 (First published: Oct. 28, 1999) // https://doi.org/10.1002/(SICI)1522-2594(199911)42:5<952::AID-MRM16>3.0.CO;2-S.

Eichner et al; "A low power radiofrequency pulse for simultaneous multislice excitation and refocusing"; Magn Reson Med. Oct. 2014;72(4):949-58. doi: 10.1002/mrm.25389. Epub Aug. 7, 2014.; 2014.

Setsompop, Kawin, et al. "Blipped?controlled aliasing in parallel imaging for simultaneous multislice echo planar imaging with reduced g?factor penalty." Magnetic resonance in medicine 67.5 (2012): 1210-1224. 2012.

Hammernik, K., et al. "Ñ-net: Systematic evaluation of iterative deep neural networks for fast parallel MR image reconstruction." arXiv preprint arXiv:1912.09278 1 (2019).; 2019.

Markus Barth et al: "Simultaneous multislice (SMS) imaging techniques : SMS Imaging"; Magnetic Resonance in Medicine.; vol. 75; No. 1; Aug. 26, 2015 ; pp. 63-81; XP055408927; ISSN: 0740-3194; DOI:10.1002/mrm.25897; URL:https://onlinelibrary.wiley.com/doi/epdf/10.1002/mrm.25897.

Griswold, Mark A. et al. "Generalized Autocalibrating Partially Parallel Acquisitions (GRAPPA)" Magnetic Resonance in Medicine, vol. 47, pp. 1202-1210, 2002 // DOI 10.1002/mrm.10171.

Knoll, Florian et al.:"Deep Learning Methods for Parallel Magnetic Resonance Image Reconstruction", in: arXiv:1904.01112v1, pp. 1-14, 2019; 2019.

Hammernik, Kerstin et al.: "Learning a Variational Network for Reconstruction of Accelerated MRI Data"; in: Magnetic Resonance in Medicine; vol. 79; pp. 3055-3071; 2018; DOI 10.1002/mrm.26977.

\* cited by examiner

SIMULTANEOUS MULTI-SLICE PROTOCOL AND DEEP-LEARNING MAGNETIC RESONANCE IMAGING RECONSTRUCTION

TECHNICAL FIELD

Various examples of the disclosure generally pertain to simultaneous multi-slice protocols for magnetic resonance imaging and associated reconstruction of images for multiple slices. Various examples of the disclosure specifically pertain to a neural network used as a regularization operation in an iterative optimization for reconstruction.

BACKGROUND

Magnetic resonance (MR) imaging is based on the excitation and detection of the dynamics of nuclear magnetization in a region under examination of an examination object, for example of a patient. The dynamics of the nuclear magnetization has frequencies in the radio-frequency (RF) spectrum. With conventional MR imaging techniques, the spatial frequency domain (also called k-space) is sampled by acquiring raw MR data. With a sufficiently dense sampling of the spatial frequency domain, an MR image can be created in the image domain by Fourier transformation of the MR raw data.

Different techniques are known for reducing the time duration (measuring period) needed for MR imaging. For example, techniques are known for simultaneously exciting nuclear magnetization in mutliple slices of the examination region and for simultaneously acquiring MR data from that number of slices. Such techniques are frequently called simultaneous multislice (SMS) imaging. See for example Setsompop, Kawin et al. "Blipped controlled aliasing in parallel imaging for simultaneous multislice echo planar imaging with reduced g-factor penalty." Magnetic resonance in Medicine 67 (2012) 1210-1224. Also, see Barth, Markus, et al. "Simultaneous multislice (SMS) imaging techniques." *Magnetic resonance in medicine* 75.1 (2016): 63-81.

Conventionally, to separate or disentangle the totality of MR data ink-space into datasets for respective slices, a technique of the type developed for parallel imaging (partial parallel acquisition, PPA) is used, which has a slice-specific reconstruction kernel for each of the slices.

A need exists for advanced techniques of reconstructing MRI measurement datasets acquired for multiple slices using an SMS protocol.

SUMMARY

This need is met by the features of the independent claims. The features of the dependent claims define embodiments.

A method of reconstructing MRI images is disclosed. The method includes obtaining at least one MRI measurement dataset. Each one of the at least one MRI measurement dataset is acquired for multiple slices using a simultaneous multi-slice protocol, an undersampling trajectory in K-space, and a receiver coil array. The method also includes performing an iterative optimization based on the at least one MRI measurement dataset. The iterative optimization is performed to obtain, for each one of the multiple slices, at least one MRI image. The iterative optimization includes, for at least some iterations of multiple iterations of the iterative optimization, a regularization operation and the data-consistency operation, to obtain respective current MRI images. The data-consistency operation is based on differences between the MRI measurement dataset and a respective at least one synthesized MRI measurement dataset. The at least one synthesized MRI measurement dataset is based on a K-space representation of a prior image of the multiple iterations, as well as based on the undersampling trajectory. The regularization operation is implemented by multiple layers of a convolutional neural network. The multiple layers are for the multiple iterations.

A computer program or a computer-program product or a computer-readable storage medium includes program code. The program code can be loaded and executed by at least one processor. Upon loading and executing the program code, the at least one processor performs a method of reconstructing MRI images. The method includes obtaining at least one MRI measurement dataset. Each one of the at least one MRI measurement dataset is acquired for multiple slices using a simultaneous multi-slice protocol, an undersampling trajectory in K-space, and a receiver coil array. The method also includes performing an iterative optimization based on the at least one MRI measurement dataset. The iterative optimization is performed to obtain, for each one of the multiple slices, at least one MRI image. The iterative optimization includes, for at least some iterations of multiple iterations of the iterative optimization, a regularization operation and the data-consistency operation, to obtain respective current MRI images. The data-consistency operation is based on differences between the MRI measurement dataset and a respective at least one synthesized MRI measurement dataset. The at least one synthesized MRI measurement dataset is based on a K-space representation of a prior image of the multiple iterations, as well as based on the undersampling trajectory. The regularization operation is implemented by multiple layers of a convolutional neural network. The multiple layers are for the multiple iterations.

A device includes a processor and a memory. The processor is configured to load program code from the memory and execute the program code. Upon executing the program code, the processor performs a method of reconstructing MRI images. The method includes obtaining at least one MRI measurement dataset. Each one of the at least one MRI measurement dataset is acquired for multiple slices using a simultaneous multi-slice protocol, an undersampling trajectory in K-space, and a receiver coil array. The method also includes performing an iterative optimization based on the at least one MRI measurement dataset. The iterative optimization is performed to obtain, for each one of the multiple slices, at least one MRI image. The iterative optimization includes, for at least some iterations of multiple iterations of the iterative optimization, a regularization operation and the data-consistency operation, to obtain respective current MRI images. The data-consistency operation is based on differences between the MRI measurement dataset and a respective at least one synthesized MRI measurement dataset. The at least one synthesized MRI measurement dataset is based on a K-space representation of a prior image of the multiple iterations, as well as based on the undersampling trajectory. The regularization operation is implemented by multiple layers of a convolutional neural network. The multiple layers are for the multiple iterations.

A method of reconstructing MRI images as disclosed. The method includes obtaining an MRI measurement dataset that is acquired for multiple slices using a simultaneous multi-slice protocol, and undersampling trajectory in K-space, and a receiver coil array. The method also includes determining multiple further MRI measurement datasets based on the MRI measurement dataset. Each one of the multiple further MRI measurement datasets is associated with a respective one of the multiple slices. For each one of the multiple further MRI measurement datasets, a respective iterative optimization is performed to obtain a respective MRI image. Each iterative optimization includes, for at least some iterations of multiple iterations of the iterative optimization, a regularization operation and a data-consistency operation, to obtain respective current MRI images. The data-consistency operation is based on differences between the respective further MRI measurement dataset and a respective synthesized MRI measurement dataset. The synthesized MRI measurement dataset is based on a K-space representation of a prior image of the multiple iterations and the undersampling trajectory. The regularization operation is implemented by multiple layers of a convolutional neural network for the multiple iterations.

A computer program or a computer-program product or a computer-readable storage medium includes program code. The program code can be loaded and executed by at least one processor. Upon loading and executing the program code, the at least one processor performs a method of reconstructing MRI images. The method includes obtaining an MRI measurement dataset that is acquired for multiple slices using a simultaneous multi-slice protocol, and undersampling trajectory in K-space, and a receiver coil array. The method also includes determining multiple further MRI measurement datasets based on the MRI measurement dataset. Each one of the multiple further MRI measurement datasets is associated with a respective one of the multiple slices. For each one of the multiple further MRI measurement datasets, a respective iterative optimization is performed to obtain a respective MRI image. Each iterative optimization includes, for at least some iterations of multiple iterations of the iterative optimization, a regularization operation and a data-consistency operation, to obtain respective current MRI images. The data-consistency operation is based on differences between the respective further MRI measurement dataset and a respective synthesized MRI measurement dataset. The synthesized MRI measurement dataset is based on a K-space representation of a prior image of the multiple iterations and the undersampling trajectory. The regularization operation is implemented by multiple layers of a convolutional neural network for the multiple iterations.

A device includes a processor and a memory. The processor is configured to load program code from the memory and execute the program code. Upon executing the program code, the processor performs a method of reconstructing MRI images. The includes obtaining an MRI measurement dataset that is acquired for multiple slices using a simultaneous multi-slice protocol, and undersampling trajectory in K-space, and a receiver coil array. The method also includes determining multiple further MRI measurement datasets based on the MRI measurement dataset. Each one of the multiple further MRI measurement datasets is associated with a respective one of the multiple slices. For each one of the multiple further MRI measurement datasets, a respective iterative optimization is performed to obtain a respective MRI image. Each iterative optimization includes, for at least some iterations of multiple iterations of the iterative optimization, a regularization operation and a data-consistency operation, to obtain respective current MRI images. The data-consistency operation is based on differences between the respective further MRI measurement dataset and a respective synthesized MRI measurement dataset. The synthesized MRI measurement dataset is based on a K-space representation of a prior image of the multiple iterations and the undersampling trajectory. The regularization operation is implemented by multiple layers of a convolutional neural network for the multiple iterations.

It is to be understood that the features mentioned above and those yet to be explained below may be used not only in the respective combinations indicated, but also in other combinations or in isolation without departing from the scope of the invention.

DETAILED DESCRIPTION

Figure 1:
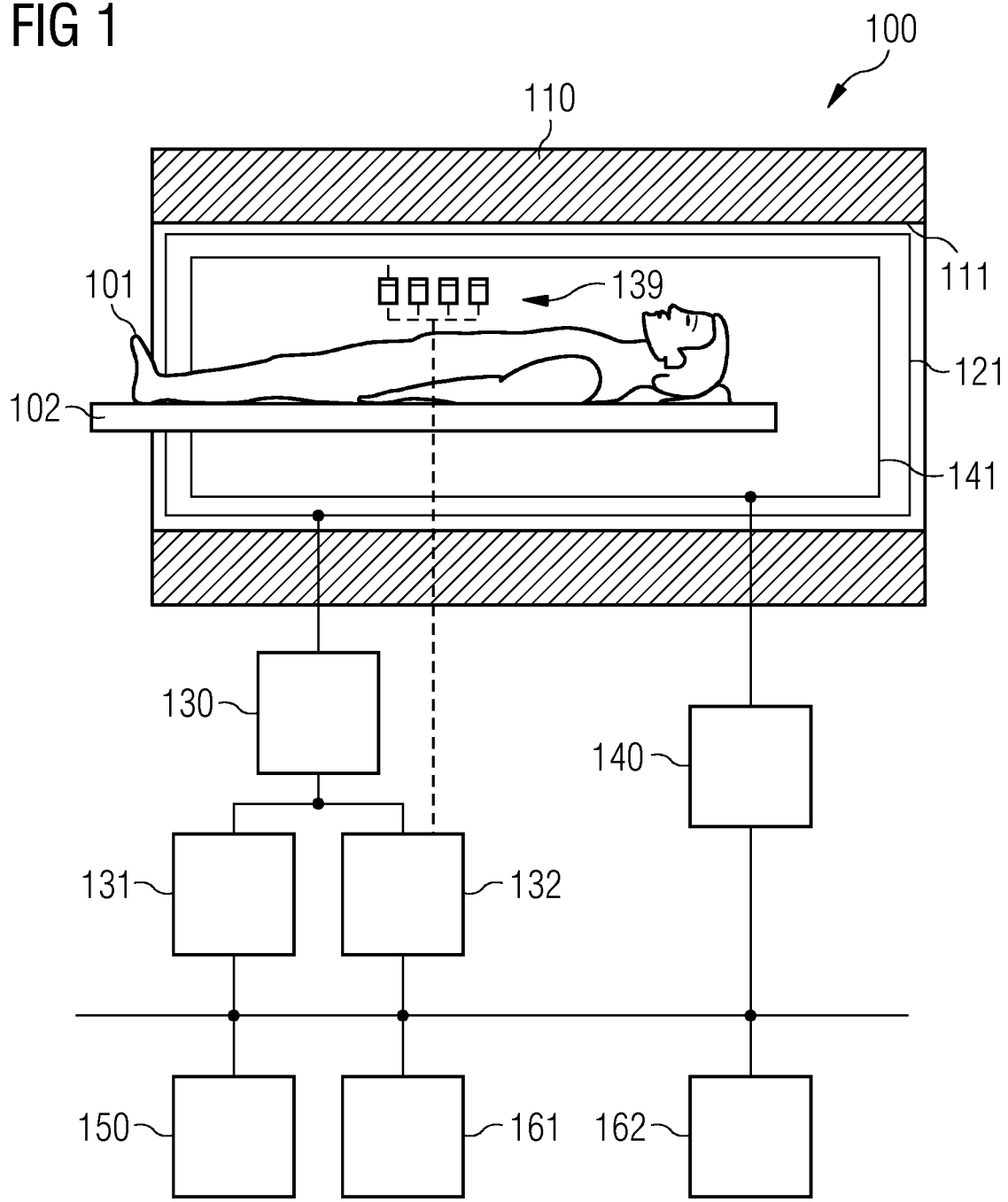
FIG. 1 schematically illustrates an MRI device according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein generally relate to MRI imaging. MRI data (or raw data) is acquired in k-space by sampling k-space. Parallel imaging can be applied. Here, MRI data is acquired using an array of receiver coils having a predefined spatial sensitivity. The set of MRI data (MRI measurement dataset) is sparsely sampled in k-space, i.e., MRI data is acquired below the Nyquist threshold for a given field of view. This is sometimes referred to as undersampling k-space. According to various examples, the MRI measurement datasets may be obtained using an undersampling trajectory. When acquiring MRI measurement datasets using an undersampling trajectory for certain k-space locations, raw MRI data is not sampled and the missing information is reconstructed later on. A so-called acceleration factor is indicative of the fraction of those k-space locations along the undersampling trajectory for which no raw data samples are acquired. Larger (smaller) acceleration factors may result in a shorter (longer) scan times.

SMS protocols can be used for image acquisition. For instance, a turbo-spin echo (TSE) SMS protocol could be used that, e.g., has an in-plane acceleration factor of 2 and a through-plane acceleration factor of 2, to thereby obtain an acceleration by a factor of 4. Protocols can also be set up for water-fat separation based on the Dixon method (details will be described below). For this, multiple contrasts corresponding to different water-fat dephasing are acquired. This can happen in an interleaved fashion or in concatenation. The acquisitions for the different water-fat dephasing typically have the same acceleration factors applied.

Then, MRI reconstruction is employed to reconstruct an MRI image (reconstructed MRI image) without or having reduced aliasing artifacts. The MRI reconstruction often relies on predetermined or calibrated coil sensitivity maps (CSMs) of multiple receiver coils of the RF receiver of the MRI device are used. This is a so-called SENSE-type reconstruction in image domain. It would also be possible to employ a GRAPPA-based reconstruction in k-space where a correlation between different receiver coils in k-space is considered, e.g., as determined using a k-space kernel at the center of the k-space.

Various techniques rely on MRI reconstruction using machine-learning (ML) algorithms. Oftentimes, a trained ML algorithm can outperform conventional reconstructions (including iterative approaches such as Compressed Sensing) when applied to a known/trained acquisition. This also goes by the name of deep learning MRI reconstruction and typically relies on neural networks (i.e., artificial neural network algorithms), specifically convolutional neural networks (CNNs).

According to examples, the reconstruction of an MRI dataset is facilitated using a ML algorithm and/or using trained functions. As a general rule, the ML algorithm employed in the various examples may include a trained neural network, e.g., a deep-learning network. A neural network that can be used for implementing the regularization operation is the U-net, see Ronneberger, Olaf, Philipp Fischer, and Thomas Brox. "U-net: Convolutional networks for biomedical image segmentation." *International Conference on Medical image computing and computer-assisted intervention*. Springer, Cham, 2015. The U-net employs skip-connections between hidden layers and down-sampling and up-sampling of feature maps. Another example is disclosed in: Yu, Songhyun, Bumjun Park, and Jechang Jeong. "Deep iterative down-up cnn for image denoising." *Proceedings of the IEEE/CVF Conference on Computer Vision and Pattern Recognition Workshops*. 2019. For instance, such architecture could be extended with hierarchical blocks. Respective aspects are described in U.S. patent application Ser. Nos. 17/457,948; 63/090,311; and 63/118,115.

For example, an iterative optimization for MRI image reconstruction can include (i) a regularization operator—that is implemented by a trained neural network such as a CNN—for filtering of the input MRI dataset using convolutions and non-linear activations; and (ii) a data-consistency operator (sometimes referred to as forward-sampling operator or data fidelity operator) for computation of an MRI forward model (signal model) to assure agreement of the reconstructed MRI dataset with the MRI measurement data.

Sometimes, the iterative optimization may include at least one iteration at the beginning and/or at least one iteration at the end that only includes a data-consistency operator, but does not include a regularization operator. This could be referred to as pre-cascades or post-cascades. For instance, post-cascades are sometimes helpful to avoid over-smoothing or over-denoising of MR images. In multi-coils setting, multiple post-cascades maybe necessary for convergence.

Multiple iterations of (i) and (ii) iteratively refine the reconstructed MRI measurement dataset, wherein an appropriate optimization technique, for example a gradient descent optimization technique or Landweber iterations, or prima-dual method, or alternating direction method of multipliers as known in the art, may be used to optimize parameters from iteration to iteration, i.e., to minimize a goal function including the regularization operator and the data-consistency operator.

The data-consistency operation can be based on the squared $\ell_2$-norm of the difference between measured data and synthesized data using the signal model. A gradient can be considered, in accordance with the optimization technique. In particular for decorrelated data with Gaussian noise this can be a good choice. The data-consistency operator can employ—e.g., for a gradient-descent type formulation of the optimization—forward and backward operators, translating between the MRI measurement dataset and the reconstructed MRI datasets/the reconstructed MRI images, respectively.

For instance, where reconstruction is SENSE-type, it is possible to propagate back from the MRI image to k-space using the signal model. Where the reconstruction is GRAPPA-type, it would be possible to reconstruct individual coil images.

For SENSE-type reconstruction, see Pruessmann, Klaas P., et al. "SENSE: sensitivity encoding for fast MRI." *Magnetic Resonance in Medicine: An Official Journal of the International Society for Magnetic Resonance in Medicine* 42.5 (1999): 952-962. The signal model will take into account the undersampling trajectory. The SENSE-type signal model, in particular, may rely on predefined CSMs. The CSMs can be calculated separately.

A SENSE-type signal model can provide for an antialiasing operation in the image domain that is based on the CSMs. The GRAPPA-type signal model can provide for reconstruction of missing k-space samples in k-space. Thus, such SENSE-type or GRAPPA-type signal models can be incorporated into the data-consistency operator, i.e., the forward and backward operators, to determine whether the reconstructed MR dataset is in good agreement with the original MR dataset.

While SENSE-type reconstruction reduces aliasing artifacts in image domain, GRAPPA-type reconstruction operates by reproducing k-space samples. See Griswold, Mark A., et al. "Generalized autocalibrating partially parallel acquisitions (GRAPPA)." *Magnetic Resonance in Medicine:*

*An Official Journal of the International Society for Magnetic Resonance in Medicine* 47.6 (2002): 1202-1210.

The regularization operation can employ a deep-neural network, e.g., a CNN. This approach of using an iterative optimization together with a deep-neural network, specifically a CNN, having layers associated with each iteration goes by the name of a variational neural network (VNN). The complete network is also called an unrolled image reconstruction network, or simply unrolled network.

Using a variational neural network image-based reconstruction (SENSE-type) using CSMs this has been disclosed in: Hammernik, Kerstin, et al. "Learning a variational network for reconstruction of accelerated MRI data." *Magnetic resonance in medicine* 79.6 (2018): 3055-3071: Eq. 3, A and A*.

By using the ML algorithm in the context of the iterative optimization and, more specifically, the regularization operation, an increased image quality of the respective reconstructed MRI dataset may be provided. A reduced noise amplification and reduced image artifacts can be obtained, in comparison with the conventional reconstruction techniques. The natural image appearance may be better preserved using ML algorithm, e.g., without causing significant blurring in comparison to techniques with hand-crafted regularization operators. Conventional compressed sensing techniques may be slow and may result in less natural looking images. Using the ML algorithm, faster image reconstruction may be achieved using a predefined number of iterations of the ML algorithm. The reconstruction time is usually several orders of magnitude faster than in other iterative methods. A further advantage of such deep-learning MRI reconstruction is that patient-specific tuning of the regularization operation of the iterative optimization is not required.

One or more parameters of the ML algorithm may be determined using a training based on a ground-truth MRI dataset, which may comprise reference MRI images with reduced MRI artifacts and/or noise amplification. The ground-truth MRI dataset can be used to generate synthetic undersampled MRI data and then MRI reconstruction can be used to reconstruct a synthetically undersampled. An offline end-to-end training is possible to obtain better results.

Next, details with respect to the variational network/the unrolled network implementing the iterative optimization are described.

For an unrolled network one considers N iterations. $\mathcal{U}=1 \ldots N$ is the index counting iterations of the optimization. The number of iterations is a hyperparameter and the networks vary from iteration to iteration, possibly also in the architecture. At the beginning ($\mathcal{U}=0$), an initial guess for the image tensor $I^{(0)}$ is assumed which has, e.g., vanishing entries or which is an initial non-trained reconstruction. From there, in each iteration:

1. An image tensor $J^{(n)}$ is determined at which the next gradient will be evaluated. This can be a linear combination of the previous image tensors $I^{(n)}$, i.e. $J^{(n)} = \sum_{i=0}^{n-1} \lambda_i I^{(i)}$. The coefficients may be fixed or trained. For $\lambda_i = c\delta_{i,n-1}$ this is an ISTA-like iteration. Also, Nesterov accelerations can be used.

More abstract, the previous images may be concatenated to a tensor $\mathcal{J}^{(n)} = (I^{(0)}, \ldots, I^{(n-1)})$ with an additional dimension running over n. Then, one can determine $$J^{(n)} = K^{(n)} \otimes \mathcal{J}^{(n)}, \tag{1}$$

where the convolution kernel $K^{(n)}$ treats n as a channel (i.e. has dense connections for this dimensions) and may further convolute spatial and/or other existing dimensions. All known updates are a subset of this generalization.

Also, a restriction to a limited number of previous images is possible. Further, the convolution kernel $K^{(n)}$ may be considered as known (relying on conventional optimization with momentum), trained, but initialized with an initial guess based on conventional techniques or trained as the other parameters (with some random initialization scheme).

2. The gradient $g^{(n)}$ is calculated at $J^{(n)}$. Again, it is possible to stack all calculated gradients $\mathcal{G}^{(n)} = (g^{(1)}, \ldots, g^{(n)})$ or consider at least more than one gradient.

3. A new image candidate is calculated. In the most abstract form through $$\tilde{I}^{(n)} = Q^{(n)} \otimes (J^{(n)}, \mathcal{G}^{(n)}), \tag{2}$$

with convolution kernel $Q^{(n)}$. The latter may be externally provided and the formulation also covers conventional gradient descent optimization with and without momentum.

4. Finally, $\tilde{I}^{(n)}$ is passed through a neural network $\ell^{(n)}$ which serves as the regularization operation $$I^{(n)} = \ell^{(n)}(\tilde{I}^{(n)}). \tag{3}$$

This is the main trained component of the reconstruction. $I^{(N)}$ is the reconstructed MRI image.

Next, it is explained how such techniques can be applied to SMS.

Such techniques can be specifically used to iteratively disentangle contributions to the MRI datasets from multiple slices for SMS protocols. In general terms, such techniques exploit that it is possible to unalias pixels from multiple slices that are acquired simultaneously using an SMS protocol using PPA concepts, e.g., SENSE-type signal models or GRAPPA-type signal models.

For instance, this has been demonstrated for SENSE in: Zahneisen, Benjamin, Thomas Ernst, and Benedikt A. Poser. "SENSE and simultaneous multislice imaging." *Magnetic resonance in medicine* 74.5 (2015): 1356-1362.

For GRAPPA (slice-GRAPPA) this has been demonstrated in: See, e.g., Setsompop, Kawin, et al. "Blipped-controlled aliasing in parallel imaging for simultaneous multislice echo planar imaging with reduced g-factor penalty." *Magnetic resonance in medicine* 67.5 (2012): 1210-1224.

The signal model for a SMS acquisition that encodes N slices based on CSMs can be formulated as $$D_I(k) = \sum_x u_{k,x} \sum_{n=1}^N C_I(x+\Delta_n) S_n(x+\Delta_n), \tag{3a}$$

where $D_I(k)$ is the acquired signal at k-space position k and for the I-th receive coil. $u_{k,x}$ are the coefficients associated with the Fourier transformation that relates k-space to image-space parametrized by the coordinate x. Note that k and x are usually multi-dimensional. $C_I(x)$ are the CSMs and $S_n(x)$ is the magnetization for slice index n. Finally, $\Delta_n$ is a shift that determines how the N slices are superimposed in the signal. The shift is usually equidistant in n and shifts in the phase-encoding direction.

Accordingly, a SENSE-type signal model, the backward operator of the data-consistency operation can be implemented with the adjoint of the multi-slice CSMs to asymptotically separate the slices; direct separation can be achieved with a slice SENSE inversion, i.e., by using the pseudo-inverse of the T×N coil sensitivities at every voxel where T is the number of coils and N the number of slices.

The slice separation at each iteration could also be performed using Slice GRAPPA.

One could also use a backward operator that performs both, i.e., is based on a SENSE-type signal model that operates in the image domain, as well as a GRAPPA-type signal model that operates in k-space.

As regards the regularization operation, that is implemented by multiple layers of a convolutional neural network, it is possible that the layers of the CNN jointly process the current MRI images. I.e., it is possible that an input to the regularization operation includes, for each iteration of the multiple iterations of the optimization, a concatenation of the multiple current MRI images along a channel dimension. Convolutions can be executed in the convolutional layers using a convolutional kernel that extends along the channel dimension. The CNN can thus be referred to as a three-dimensional CNN. Thereby, information is exchanged in between the multiple MRI images associated with the different slices.

In the SMS protocol, it is possible to acquire one of the slices with a phase modulation, to improve the conditioning of the coil array; such phase modulation can translate into a circular shift in the MRI images. The circular shift is inverted after reconstruction. To avoid boundary artifacts from the shifts, the CNN can be made equivariant to circular shifts by performing a periodic padding of the feature maps at every convolutional layer. Thus, the CNN can include, for each convolutional layer, and associated circular padding layer. Circular boundary conditions can be used.

Next, extension of such techniques to chemical shift imaging are disclosed.

Above, techniques of MRI image reconstruction for SMS protocols have been disclosed. These SMS protocols can be extended to accommodate for chemical-shift imaging, i.e., where separation of different spin species becomes possible. Likewise, the MRI image reconstruction as disclosed above, can be extended to reconstruct multiple contrasts, for the different slices, associated with different spin species. Dixon-type imaging is possible. Fat-water separation is possible. Respective aspects will be disclosed below.

According to various examples, the SMS protocol can be extended to be able to separate different spectral components of the MRI data associated with different spin species, e.g., nuclear spins in a fat environment and other nuclear spins in a water environment. Oftentimes, the chemical shift between hydrogen nuclear spins in water as a first spin species and hydrogen nuclear spins in fatty acids as a second spin species is considered (simply water and fat spin species hereinafter). For this, conventionally, chemical-shift-imaging multipoint MRI measurement sequences are employed which can be accelerated in-plane and through-plane. Such techniques typically are based on the effect of the resonance frequency of nuclear spins depending on the molecular/chemical environment. This effect is termed chemical shift. Various spin species thus exhibit different resonance frequencies. For instance, a difference between two resonance frequencies can be expressed in terms of parts per million (ppm). For example, the main fat peak oscillates at a frequency that is −3.4 ppm next to that of the water protons.

For water-fat separation, a water MRI image can be determined having a contrast that is affected by water spins (but not or only to a limited degree by fat spins); and a fat MRI image can be determined having a contrast that is affected by fat spins (but not, or only to a limited degree, by water spins).

To separate the spectral components, MRI data is acquired at multiple echo times. The echo time in this context refers to a time offset relative to a timepoint for which water and fat—or generally the different spin species—are aligned, i.e., the magnetization points into the same direction. In particular, for spin-echo sequences, such time offset can also take negative values. In this case, the contrast refers to a timepoint before refocusing water and fat signals are aligned.

Specifically, it is possible to acquire MRI data for multiple slices at each one of the multiple echo times.

Generally, the time evolution of MRI data (MRI signals) associated with different spin species exhibit different phase offsets at different echo times, due to the chemical shift. This effect can be exploited to separate the MRI signals and determine respective MRI images, i.e., for different spin species at the multiple slices simultaneously acquired.

According to reference implementations, a signal model is used which models the MRI signals based on various physical parameters such as the water and fat contribution to a respective pixel/voxel (hereinafter, the term pixel is intended to embrace 3-D structures such as voxels). These physical parameters can, depending on the complexity of the signal model, encompass additional properties of the measurement system, specifically various imperfections affecting the reference value of the phase (simply, reference phase). A respective phase map can be considered. The phase map of the signal model can describe the spatial evolution of the reference phase of the MRI data due to the polarizing magnetic field being inhomogeneous and/or due to use of bipolar readout gradient fields of the measurement protocol used for creating gradient echoes at the multiple echo times.

The signal model can be fitted to the time evolution of the MRI data, thereby finding parameter values for the physical parameters and specifically separating water and fat contributions to the MRI signal.

The signal model can be considered as part of the data-consistency operation in the iterative optimization for reconstruction.

Depending on a particular post-processing technique, the implementation of the signal model can vary. For instance, conventional Dixon processing would not consider the chemical shifts going into opposite directions for the different polarities of a bipolar readout train of the measurement protocol; this would lead to so-called chemical shift artifacts such as artificial lines at tissue borders. The same applies to non-Cartesian acquisitions for which the chemical shift leads to a convolution of the fat signal, typically resulting in off-resonance blurring.

Hereinafter, techniques are disclosed that facilitate separating multiple spectral components included in MRI signals. Multiple MRI images can be determined having contrasts associated with respective spin species. A first spin species may be fat, and a second spin species may be water. However, as a general rule, arbitrary spin species can be separated, e.g., nuclear spins in a silicon environment, etc. It would also be possible to separate spectral components for more than two spin species. Nonetheless, hereinafter, for sake of simplicity, reference will be made to water and fat separation.

According to examples of the disclosure, an MRI water images and an MRI fat images are determined for multiple slices that are simultaneously acquired.

According to various examples, this is based on performing an iterative optimization to determine the MRI water image and the MRI fat image. The iterative optimization defined according to Eqs. 1-3 can be extended accordingly. The iterative optimization finds an extreme value for a target function that calculates a dephasing of the two spin species—i.e., water and fat—with respect to each other. In other words, the chemical shift between the two spin species can be taken into account. This dephasing is calculated considering the respective readout time at which a data sample of the MRI is acquired. The readout time is defined by the sampling trajectory of the measurement protocol. Accordingly, the optimization can be based on a target function that calculates, based on the sampling trajectory of the measurement protocol, the dephasing of the water with respect to the fat.

The optimization operates based on multiple MRI images that are acquired for multiple echo times and for multiple slices using a respective multi-point SMS measurement protocol. These MRI images at different echo times will be referred to as MRI echo images hereinafter. Each one of the multiple MRI images includes a contrast that is associated with a superposition of the signal contributions of water spin species and the fat spin species at the respective echo time.

In further detail: MRI data is acquired using a multipoint MRI measurement sequence. I.e., MRI data are acquired for multiple echo times. These echo times denote the offset to a reference timing at which the multiple spin species do not exhibit a phase offset.

As a general rule, a two-point measurement protocol could be used. Here, the count of echo times is not larger than 2. This is based on the finding that even for a comparably small number of MRI echo images, accurate determination of MRI water image an MRI fat image is possible using the techniques disclosed herein. For each echo time, multiple slices may be sampled using SMS.

For instance, a gradient echo sequence such as the one described by the following reference could be used: X. Zhong, M. D. Nickel, S. A. Kannengiesser, B. M. Dale, B. Kiefer, and M. R. Bashir, "Liver fat quantication using a multi-step adaptive fitting approach with multi-echo GRE imaging," Magn. Reson. Med., vol. 72, no. 5, pp. 1353-1365, 2014.

For example, a 2-D gradient echo sequence can be used that is extended to multiple slices. A 3-D gradient echo sequence could be used.

The measurement protocol, in some examples, includes a bipolar gradient echo readout train. This means that subsequent gradient echoes are formed using gradient pulses having opposing directions (i.e., different polarities).

Each raw data sample is sampled by monitoring the nuclear spin signal during a readout duration at the respective echo time. Typical readout durations are 1-3 ms, also depending on the magnetic field strengths.

The signals of different spin species evolve differently as a function of time, i.e., during the readout duration and along the multiple echo times. These dependencies are captured by the signal model describing the evolution of the overall signal as a function of time. For instance, the following signal model can be used:

$$S_E(x,t)=(W(x)+c(t)F(x))(\phi_E(t,x)),\qquad(4)$$

where x is pixel position (not necessarily only in readout direction), t is the time, E is the echo/contrast index, $W(x)$ the water signal, $F(x)$ the fat signal, $c(t)$ the fat dephasing and $\phi_E(t,x)$ the phase evolution/error (phase evolution map).

Thus, in Eq. 4, E indices multiple MRI echo images $S_E(x,t)$ that are acquired for multiple echo times using a measurement protocol, each one of the multiple MRI images including a contrast that is associated with the water spin species, as well as the fat spin species.

The phase evolution $\phi_E(t,x)$ in Eq. 4 has similarities to CSMs, cf. Eq. 3a. Hence, a reconstruction is similar to SENSE can be employed for Eq. 4; i.e., the reconstruction can relate the k-space data linearly to the MRI images.

The signal model of Eq. 4 can be extended to SMS where multiple slices—indexed by n—are acquired.

As stated in Eq. (4), the magnetization may further be parameterized by its differing chemical components and multiple echoes with different dephasing of the chemical components may be acquired. In that case the magnetization in the upper equation is generalized as follows: For a monopolar acquisition by $$S_{n,E}(x)=(W_n(x)+c_E F_n(x))\phi_E(x),\qquad(4a)$$

where E is indexing the different contrasts, $c_E$ is the relative dephasing of the fat signal and $\phi_E(x)$ the phase evolution. For a bipolar acquisition furthermore the fat shift due to the finite duration of the readout may be considered $$S_{n,E}(x)=(W_n(x)+c_E F_n(x+\delta))\phi_E(x),\qquad(4b)$$

where $\delta$ is the relative shift of the fat signal in readout direction.

Based on Eqs. 4a and 4b, it is thus possible to directly determine MRI images associated with different chemical species, e.g., water and fat, by considering the phase evolution map.

In the wording of Hammernik, Kerstin, et al. "$\Sigma$-net: Systematic Evaluation of Iterative Deep Neural Networks for Fast Parallel MR Image Reconstruction." arXiv preprint arXiv:1912.09278 (2019), Eqs. 4a and 4b corresponds to a sensitivity network (SENSE-type reconstruction). It is also possible to keep the induvial coil information (GRAPPA-type reconstruction) and employ a generalized version of a parallel coil network. In that case the magnetization is calculated for each receive coil individually and correlations between receive coil elements are used to constrain the reconstruction.

Based on the signal model of Eq. 4, a target function of the iterative optimization can be formulated to determine the water image and the fat image based on the respective, a priori unknown, signal contributions $W(x)$ and $F(x)$. The optimization finds extreme values of the target function.

Next, it will be described how to arrive at this target function starting from Eq. 4 (but this could be readily extended to Eqs. 4a and 4b for SMS imaging).

First, the phase maps $\phi_E(t,x)$ for each echo time is assumed to be known. Thus, generally, the target function of the optimization can take into account a predetermined phase map of the reference phase impacting the MRI echo images.

There are various options available for determining the phase maps, i.e., initializing the phase maps. For example, the conventional Dixon technique relies on the fact that these phase maps are spatially and temporally smooth and therefore boundary effects are not critical. Thus, the phase maps $\phi_E(t,x)$ can be determined using a further optimization such as used in conventional Dixon processing that neglects the effects of the sampling trajectory on the dephasing of the water signal with respect to the fat signal.

It is, in some examples, possible to update the phase maps taking into account the chemical-shift corrected MRI water and fat images determined using the optimization; and then re-iterate the Dixon processing (or general the further optimization) and performing of the optimization; thereby the phase maps $\phi_E(t,x)$ can be iteratively re-determined using two different optimizations until convergence is achieved. This increases the overall accuracy of determining the MRI water and fat images.

Second, the (fat) dephasing can be calculated for each k-space position. Here, the general form of c(t) is assumed to be known. The dephasing between water and fat components can be calculated based on a single-peak model for the various spin species: $c_{single-peak}(t)=e^{i\Delta\omega Ft}$. Here, $\Delta\omega$ defines the frequency offset with respect to water, e.g., for water—fat—3.4 ppm multiplied with Larmor frequency. Also, multi-peak models exist to better consider the chemical components of fat.

Specifically, the dephasing can be calculated based on the sampling trajectory of the measurement protocol. This gives a k-space position for each point in time; specifically, for different k-space positions along a readout line, different points in time are obtained that are associated with different dephasing. Based on knowledge of the sampling trajectory of the acquisition, it is then possible—starting from Eq. 1—to associate the position in the Fourier-transformed frequency domain (k-space) with a certain readout time t. The dephasing during each readout duration can be taken into account. Thus, for the purpose of calculating the dephasing of fat with respect to water—e.g., using the single-peak approximation outlined above—the MRI fat image F(x) can be transformed to Fourier domain and then the respective dephasing can be applied for each K-space position. Then, a back-transformation to image domain can be applied. Specifically, the polarity of the multiple readout gradients of a bipolar gradient-echo readout train of the measurement protocol can be taken into account. To reflect this, Eq. 1 can be rewritten. For example, absorbing the known $\phi_E(t,x)$ into the known $S_E(x,t)$ and shifting to vector notation, one obtains, based on Eq. 4:

$$\vec{S}_E = \vec{W} + \leftrightarrow^{-1}\vec{C}\vec{U}\vec{F}, \quad (5)$$

for each one of the multiple MRI echo images, i.e., for E=1, 2, . . . . Here $\vec{U}$ is the Fourier transform from image to frequency domain and $\vec{U}^{-1}$ its inverse. Furthermore, $\vec{C}$ is a diagonal matrix (i.e., elementwise multiplication) with c(t) at the associated k-space position of the sampling trajectory: This means that the dephasing can be calculated based on the timepoint at which a respective k-space position is sampled. More generally, the dephasing of fat with respect to water is calculated in K-space (more specifically an "effective" k-space obtained from Fourier transform for single-coil acquisition, as explained above) and applied as correction to each K-space data point of the K-space representation of the MRI fat image. This implements the chemical shift correction.

Based on Eq. 5, an (image-only) data-consistency operation for the post-processing task of calculating chemical-shift-corrected water and fat images by means of an optimization is $$D(\vec{W},\vec{F}) = \Sigma_E \|\vec{S}_E - \vec{W} - \vec{C}\vec{U}\vec{F}\|_2^2. \quad (6)$$

A target function of the optimization can include this data consistency term.

Considering SMS (cf. Eqs. 4a and 4b), the current MRI images considered at the iterations of the iterative optimization are associated with, both, multiple slices, as well as different time offsets. Specifically, an input to the regularization operation can include, for each iteration of the multiple iterations, a concatenation of such MRI images along the channel dimension, i.e., for different time offsets, as well as for different slices.

Hence, phase evolution maps and CSMs are provided as input, and then the water and fat images can be directly reconstructed for a SMS Dixon acquisition.

This is based on that finding that the simultaneously excited slices and the k-space data of each multi-point contrast are linearly connected to W and F. Therefore, the PPA reconstruction results in a generalized SENSE or GRAPPA reconstruction that determines the water and fat signal from the sampled k-space data.

FIG. 1 depicts aspects with respect to an MRI device 100. The MRI device 100 includes a magnet 110, which defines a bore 111. The magnet 110 may provide a DC magnetic field of one to six Tesla along its longitudinal axis. The DC magnetic field may align the magnetization of the patient 101 along the longitudinal axis. The patient 101 may be moved into the bore by means of a movable table 102.

The MRI device 100 also includes a gradient system 140 for creating spatially-varying magnetic gradient fields (gradients) used for spatially encoding MRI data. Typically, the gradient system 140 includes at least three gradient coils 141 that are arranged orthogonal to each other and may be controlled individually. By applying gradient pulses to the gradient coils 141, it is possible to apply gradients along certain directions. The gradients may be used for slice selection (slice-selection gradients), frequency encoding (readout gradients), and phase encoding along one or more phase-encoding directions (phase-encoding gradients). The directions along which the various gradients are applied are not necessarily in parallel with the axes defined by the coils 141. Rather, it is possible that these directions are defined by a certain K-space trajectory—e.g., of a respective MRI measurement blade —, which, in turn, may be defined by certain requirements of the respective MRI sequence and/or based on anatomic properties of the patient 101. Gradients can also be used for forming gradient echoes. For instance, a gradient pulse train can be used that has gradients of opposing polarity.

For preparation and/or excitation of the magnetization polarized/aligned with the DC magnetic field, RF pulses may be applied. For this, an RF coil assembly 121 is provided which is capable of applying an RF pulse such as an inversion pulse or an excitation pulse or a refocusing pulse (that can address multiple slices for SMS). While the inversion pulse generally inverts the direction of the longitudinal magnetization, excitation pulses may create transversal magnetization. Specifically, excitation pulses may be used that are capable of exciting magnetization in multiple slices, for SMS protocols. One such pulse—other examples are possible—is described, e.g., here: Eichner, Cornelius, Lawrence L. Wald, and Kawin Setsompop. "A low power radiofrequency pulse for simultaneous multislice excitation and refocusing." *Magnetic Resonance in Medicine* 72.4 (2014): 949-958.

For creating RF pulses, a RF transmitter 131 is connected via a RF switch 130 with the coil assembly 121. Via a RF receiver 132, it is possible to detect signals of the magnetization relaxing back into the relaxation position aligned with the DC magnetic field. In particular, it is possible to detect echoes; echoes may be formed by applying one or more RF pulses (spin echo) and/or by applying one or more gradients (gradient echo). The magnetization may inductively coupled with the coil assembly 121 for this purpose. Thereby, raw MRI data in K-space is acquired.

Generally, it would be possible to use separate coil assemblies for applying RF pulses on the one hand side and for acquiring MRI data on the other hand side (not shown in FIG. 1).

The MRI device 100 further includes a human machine interface 150, e.g., a screen, a keyboard, a mouse, etc. By means of the human machine interface 150, a user input may be detected and output to the user may be implemented. For example, by means of the human machine interface 150, it is possible to set certain configuration parameters for the MRI sequences to be applied.

The MRI device 100 further includes a processing unit (simply processor) 161. The processor 161 may include a GPU and/or a CPU. The processor 161 may implement various control functionality with respect to the operation of the MRI device 100, e.g., based on program code loaded from a memory 162. For example, the processor 161 could implement a sequence control for time-synchronized operation of the gradient system 140, the RF transmitter 131, and the RF receiver 132. The processor 161 may also be configured to implement an MRI reconstruction, i.e., implement post-processing for MRI reconstruction of MRI images based on MRI measurement datasets and separation of multiple spin species.

It is not required in all scenarios that processor 161 implements post-processing for reconstruction of the MRI images. In other examples, it would be possible that respective functionalities implemented by a separate device, such as the one as illustrated in FIG. 2.

Figure 2:
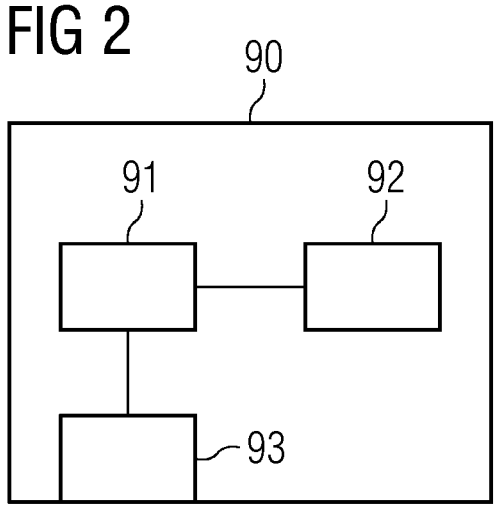
FIG. 2 schematically illustrates a processing device according to various examples.

FIG. 2 schematically illustrates a device 90 according to various examples. The device 90 includes a processing unit/processor 91 and a memory 92. The processor 91 can obtain an MRI measurement dataset via an interface 93, e.g., from a hospital database, a computer-readable storage medium, or directly from an MRI device 100 as discussed in connection with FIG. 1. Upon loading program code from the memory 92, the processor 91 can post-process the MRI measurement dataset, to reconstruct an MRI image. Details with respect to such processing are illustrated in connection with FIG. 3.

Figure 3:
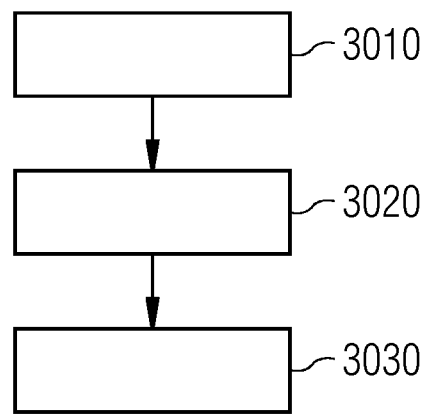
FIG. 3 is a flowchart of a method according to various examples.

FIG. 3 is a flowchart of a method according to various examples. For illustration, the method of FIG. 3 could be executed by the processor 161 of the MRI device 100, upon loading program code from the memory 162. It would be possible that the method of FIG. 3 is executed by the processor 91 of the device 90, upon loading program code from the memory 92.

At box 3010, at least one MRI measurement dataset is obtained. The at least one MRI measurement dataset has been acquired using an undersampling trajectory of k-space and a receiver coil array (cf. FIG. 1, MRI device 100, receiver coil array 139).

The at least one MRI measurement dataset is acquired for multiple slices using an SMS protocol.

Sometimes, multiple MRI measurement datasets can be obtained, for multiple echo times. This can facilitate separation of multiple spin species. Still, multiple slices can be sampled for each one of the multiple echo times.

The at least one MRI measurement dataset can be loaded from a memory. It would be possible that the at least one MRI measurement dataset is obtained from an MRI measurement, e.g., using the processor 161 of the MRI device 100 (cf. FIG. 1).

Sometimes, it would be possible to also determine phase maps of a reference phase for each echo time, where multiple MRI measurement datasets are obtained for multiple echo times. This could be based on an optimization that is performed using a target function that is determined based on a signal model that neglects a dephasing of the multiple considered spin species with respect to each other for the various read out directions and echo times, due to the impact of sampling trajectory of the measurement protocol. Conventional reconstruction can be used.

Next, at box 3020, an iterative optimization is performed to obtain multiple reconstructed MRI images, for the multiple slices. This corresponds to MRI reconstruction. The optimization include a data-consistency operation and a regularization operation. Using the regularization operation, the ill-posed nature of the data-consistency operation can be compensated for. The regularization operation can be implemented using a pre-trained variational neural network. Multiple MRI images are obtained for multiple slices. Sometimes, for each slice, multiple contrasts can be obtained, e.g., for water and fat.

At box 3030, the reconstructed MRI images are output, e.g., to the user via a user interface. The reconstructed MRI image could also be stored.

Details with respect to the iterative optimization of box 3020 are described below in connection with FIG. 4.

Figure 4:
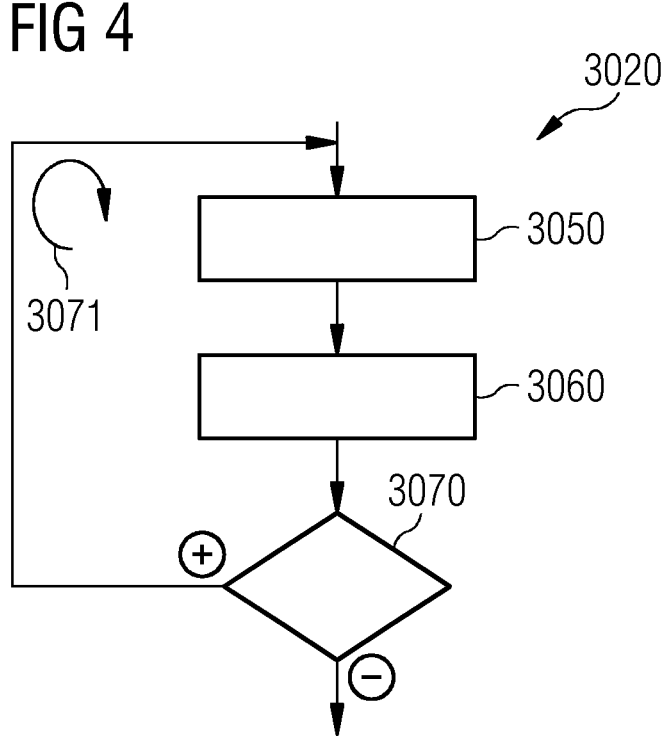
FIG. 4 illustrates details with respect to an iterative optimization according to various examples.

FIG. 4 illustrates multiple iterations 3071. Each iteration 3071 includes a regularization operation, box 3050; and a data-consistency operation at box 3060.

A concrete implementation of box 3050 and box 3060 could be based on Knoll, Florian, et al. "Deep learning methods for parallel magnetic resonance image reconstruction." *arXiv preprint arXiv*:1904.01112 (2019): equation 12. Here, the left term included in the bracket corresponds to the regularization operation and the right term included in the bracket corresponds to the data-consistency operation.

Then, at box 3070, it is checked whether a further iteration is required; and, in the affirmative, box 3050 and box 3060 are re-executed.

It would be possible that at box 3070 it is checked whether a certain predefined count of iterations has been reached. This can be an abort criterion. Other abort criteria are conceivable, e.g., as defined by the optimization method (convergence into a minimum), e.g., gradient descent.

Summarizing, techniques have been disclosed where at least one MRI measurement dataset is obtained that has been acquired using a K-space trajectory that is accelerated both in plane and through plane. Multiple slices are simultaneously excited and sampled. A reconstruction has been disclosed that is based on a variational neural network.

An iterative slice separation is thereby provided that can incrementally improve the separation quality at each iteration. SMS can be facilitated for cases with direct separation is poor due to conditioning of the coil array. Higher SMS factors may become feasible, in view of reduced noise and reduced residual aliasing artifacts.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, scenarios have been disclosed where MR data of an MRI measurement dataset associated with different ones of the multiple slices are disentangled as part of the iterative optimization that relies on a regularization operation implemented by a variational neural network. Such variational neural network can jointly process the MRI images associated with the multiple slices and, as such, may be referred to as a 3-dimensional variational neural network. However, in various scenarios, it would be possible to firstly disentangle MR data associated with multiple slices, to thereby obtain multiple further MRI measurement datasets are acquired for individual slices using a respective undersampling trajectory. This could be achieved using slice GRAPPA, see, e.g., Setsompop, Kawin, et al. "Blipped-controlled aliasing in parallel imaging for simultaneous multislice echo planar imaging with reduced g-factor penalty." *Magnetic resonance in medicine* 67.5 (2012): 1210-1224. Another option would be using SENSE. Then, these multiple MRI measurement datasets can be processed using conventional reconstruction, e.g., using a regularization operation that is based on a (2-dimensional) variational neural network.

The invention claimed is:

1. A method of reconstructing Magnetic Resonance Imaging, MRI, images, comprising:
    obtaining at least one MRI measurement dataset, each one of the at least one MRI measurement dataset being acquired as a combined signal from multiple simultaneously excited slices using a simultaneous multi-slice protocol, an undersampling trajectory in k-space, and a receiver coil array, wherein signals from the multiple slices interfere in the combined signal, and wherein the simultaneous multi-slice protocol applies a phase modulation to multiple slices of the MRI measurement dataset; and
    based on the at least one MRI measurement dataset, performing an iterative optimization to separate the interfering signals and obtain, for each one of the multiple slices, at least one MRI image,
    wherein the iterative optimization comprises, for at least some iterations of multiple iterations of the iterative optimization, a regularization operation and a data-consistency operation to obtain respective current MRI images,
    wherein the data-consistency operation incorporates slice separation using sensitivity encoding or k-space correlations to disentangle contributions from individual slices and is based on differences between the MRI measurement dataset and a respective at least one synthesized MRI measurement dataset, the synthesized MRI measurement dataset being based on a k-space representation of a prior image of the multiple iterations and the undersampling trajectory, and
    wherein the regularization operation is implemented by multiple layers of a convolutional neural network for the multiple iterations, and the convolutional neural network comprises, for each convolutional layer, an associated circular padding layer.

2. The method of claim 1,
    wherein the layers of convolutional neural network jointly process the respective current MRI images for the at least some iterations.

3. The method of claim 1,
    wherein an input to the regularization operation comprises, for each iteration of the at least some iterations, a concatenation of the respective current MRI images concatenated along a channel dimension, and
    wherein convolutional kernels of the layers extend along the channel dimension.

4. The method of claim 1,
    wherein the at least one synthesized MRI measurement dataset is based on an antialiasing operation in image domain that is based on a sensitivity map associated with the receiver coil array.

5. The method of claim 1,
    wherein the at least one MRI measurement dataset comprises a sequence of MRI measurement datasets, the MRI measurement datasets of the sequence of MRI measurement datasets being acquired at multiple time offsets with respect to at least one excitation pulse and/or with respect to at least one refocusing pulse, and
    wherein the current MRI images of each iteration of the iterative optimization are associated with different ones of the multiple slices as well as different ones of the multiple time offsets.

6. The method of claim 5,
    wherein the current MRI images of each iteration are associated with different chemical species by considering a respective phase evolution map.

7. A method of reconstructing Magnetic Resonance Imaging, MRI, images, the method comprising:
    obtaining an MRI measurement dataset acquired for multiple slices using a simultaneous multi-slice protocol, an undersampling trajectory in k-space, and a receiver coil array, wherein the simultaneous multi-slice protocol applies a phase modulation to multiple slices of the MRI measurement dataset; and
    based on the MRI measurement dataset, determining multiple further MRI measurement datasets, each one of the multiple further MRI datasets being associated with a respective one of the multiple slices,
    for each one of the multiple further MRI measurement datasets, performing a respective iterative optimization to obtain a respective MRI image,
    wherein each iterative optimization comprises, for at least some iterations of multiple iterations of the iterative optimization, a regularization operation and a data-consistency operation to obtain respective current MRI images,
    wherein the data-consistency operation is based on differences between the respective further MRI measurement dataset and a respective at least one synthesized MRI measurement dataset, the synthesized MRI measurement dataset being based on a k-space representation of a prior image of the multiple iterations and the undersampling trajectory, and
    wherein the regularization operation is implemented by multiple layers of a convolutional neural network for the multiple iterations, and the convolutional neural network comprises, for each convolutional layer, an associated circular padding layer.

8. A non-transitory computer program medium comprising program code that is executable by a processor, the processor, upon executing the program code being configured to perform the method of claim 1.

9. A device comprising a processor and a memory storing program code, the processor being configured to load and execute the program code and, upon executing the program code, to perform the method of claim 1.

* * * * *